United States Patent [19]

Breed

[11] 4,198,864
[45] Apr. 22, 1980

[54] VELOCITY CHANGE SENSOR AND RECORDER

[75] Inventor: David S. Breed, Boonton, N.J.

[73] Assignee: Breed Corporation, Fairfield, N.J.

[21] Appl. No.: 938,467

[22] Filed: Aug. 31, 1978

[51] Int. Cl.$^2$ ............................................. G01P 15/04
[52] U.S. Cl. ...................................................... 73/492
[58] Field of Search ................... 73/492, 514; 116/203; 200/61.53

[56] References Cited
U.S. PATENT DOCUMENTS

| 2,825,297 | 3/1958 | Harrison | 116/203 |
|---|---|---|---|
| 3,097,534 | 7/1963 | Pasieka | 73/492 |
| 3,380,046 | 4/1968 | Paonessa | 200/61.53 X |
| 3,974,350 | 8/1976 | Breed | 200/61.53 |

FOREIGN PATENT DOCUMENTS 373170  5/1932  United Kingdom ...................... 73/492

Primary Examiner—Jerry W. Myracle
Attorney, Agent, or Firm—Learman & McCulloch

[57] ABSTRACT

Apparatus for sensing and recording changes in the velocity of a vehicle involved in a crash comprises a sensing mass biased to an initial position in which it remains until it is acted upon by an acceleration pulse of such magnitude as to overcome the biasing force, whereupon the mass moves from its initial position a distance proportional to the magnitude and duration of such pulse. If the magnitude and duration of the pulse are less than preselected values, decay of the pulse enables the biasing force to return the mass to its initial position. If the magnitude and duration of the pulse are greater than such preselected values, however, retaining means act on the mass to retain the latter in its position of maximum movement from its initial position, thereby providing an indication of the velocity change. Preferably, indicia is associated with a sensing means to facilitate determination of the velocity change.

22 Claims, 7 Drawing Figures

VELOCITY CHANGE SENSOR AND RECORDER

BACKGROUND OF THE INVENTION

For the past several years there has been considerable debate as to the desirability and efficacy of installing an automatically inflatable airbag passenger restraint system in automotive vehicles. Both the proponents and opponents of such system rely on estimates of the severity of crashes involving such vehicles. Unfortunately, however, there is a lack of reliable data relating to the severity of crashes of the kind experienced in circumstances other than those involving carefully controlled and monitored test crashes. Test crashes, however, rarely conform to actual, accidental crashes. It has been proposed, therefore, to provide vehicles with crash recorders capable of measuring acceleration. Statistical analyses, such as one conducted by the University of Utah, have indicated that approximately three million such crash recorders would be required to obtain statistically significant crash data in a reasonable period of time. The cost of crash recorders available heretofore, however, even in large volume production, is so great that the use of such crash recorders is prohibitive.

A principal object of this invention is to provide an extremely reliable crash recorder capable of being manufactured at a small fraction of the cost of recorders heretofore known, thereby making it financially feasible to equip vehicles with crash recorders.

SUMMARY OF THE INVENTION

A velocity change sensor and recorder constructed in accordance with the invention is particularly adapted for use in a vehicle for the purpose of sensing and recording the severity of a crash in which the vehicle may be involved. The severity of a crash is directly related to the vehicle's velocity change above a minimum acceleration. Apparatus constructed in accordance with the invention comprises a sensing mass mounted within a cylinder with sufficient clearance between the mass and the cylinder to enable the mass to be displaced longitudinally in response to a rapid change in velocity of the vehicle. The sensing mass normally is biased to an initial position under a force which must be exceeded by the acceleration before the mass is capable of moving within the cylinder. If the acceleration is sufficiently large to enable the biasing force to be overcome with consequent displacement of the mass, but is of relatively short duration, the biasing force reasserts itself and returns the sensing mass to its initial position. If, however, the acceleration is sufficiently large to enable displacement of the sensing mass, and of sufficient duration to enable the mass to be displaced a predetermined distance, means is provided to retain the mass in its adjusted position of maximum displacement from its initial position, thereby enabling subsequent inspection of the apparatus to indicate the velocity change to which the mass was subjected and hence the severity of the crash. Preferably, the apparatus includes an indicator which is movable in response to movement of the sensing mass and which may be utilized in conjunction with calibrated indicia to simplify the determination of the crash severity.

The sensing mass preferably comprises a sphere positioned within the bore of a cylinder, the diameters of the sphere and the cylinder bore being so related as to provide between the sensing mass and the inner surface of the cylinder bore a small clearance for the passage of gas which damps or controls the rate of movement of the sphere relative to the cylinder. A portion of the inner surface of the cylinder commencing at a point spaced from that end of the cylinder occupied by the sensing mass when the latter is in its initial position, is frosted to provide a roughened surface having pits or recesses therein. The remaining portion of the inner surface of the cylinder is smooth.

Also accommodated in the cylinder is a quantity of small, preferably spherical particles which follow the sensing mass when the latter is displaced from its initial position. If the displacement of the mass in response to acceleration of the vehicle is insufficient to enable the small particles to reach the frosted portion of the surface of the cylinder, decay of the acceleration pulse will enable the biasing force to return the mass to its initial position, the mass pushing the particles ahead of it. If, however, the mass is displaced a distance sufficient to enable it and some of the particles to reach the frosted portion of the cylinder's inner surface, such particles will seat in the pits or recesses and exert a wedging force between the sensing mass and the cylinder when the biasing means attempts to return the mass to its initial position. The wedging force is sufficient to overcome the force of the biasing means, thereby resulting in retention of the mass at the point of its maximum displacement from its initial position.

Indicia comprising a movable indicator and stationary reference marks are provided to indicate or record the maximum displacement of the sensing mass from its initial position, thereby enabling the velocity change and the severity of the crash to be ascertained.

DESCRIPTION OF THE DRAWINGS

Apparatus constructed in accordance with a preferred embodiment of the invention is disclosed in the accompanying drawings, in which.

Figure 1:
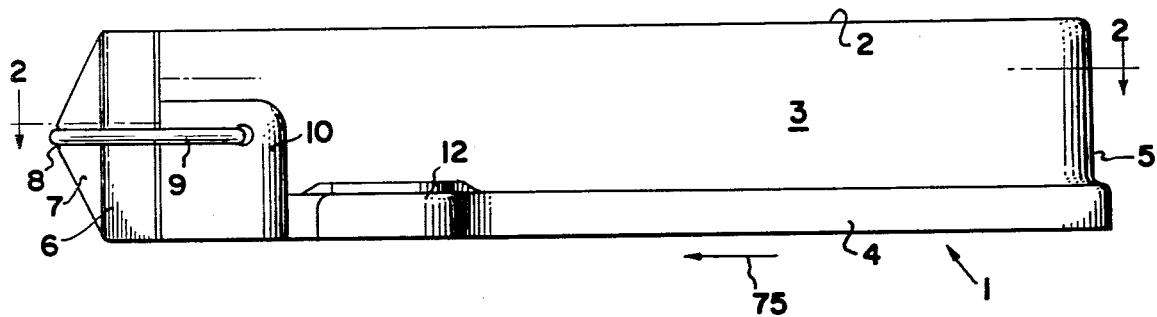
FIG. 1 is a side elevational view of a casing in which a velocity change indicator is adapted to be mounted.

Velocity change indicating and recording apparatus according to the invention is adapted for removable insertion within a sturdy, hollow casing 1 having a top wall 2, parallel side walls 3, a bottom wall 4, and one end wall 5. The opposite end of the casing is open, but is adapted to be closed by a closure 6 provided with an external, tapering cam 7 having a central notch 8. A bail 9 has its opposite ends pivoted in reinforced sections 10 of the casing and its web 11 adapted for reception in the notch 8 for removably securing the closure 6 to the casing. Extending from opposite sides of the casing is a pair of apertured mounting ears 12 by means of which the casing may be fixed to some desired portion of a vehicle (not shown) with the longitudinal axis of the casing extending parallel to a selected axis of the vehicle.

The velocity change indicating and recording apparatus comprises a housing 13 snugly and removably accommodated in the casing 1. Adjacent one side of the housing is a longitudinally extending bore 14 terminating at one end in a shoulder 15 and at its opposite end in a threaded counterbore 16. Snugly fitted into the bore 14 and abutting the shoulder 15 is an elongate tubular member 17 preferably comprising a glass cylinder having a bore 18 extending longitudinally therethrough. That end of the cylinder 17 adjacent the casing end wall 5 is closed and sealed by a fitting 19 having a spherical seat 20 confronting the bore 18. The fitting 19 is maintained in assembled relation with the cylinder 17 by means of a plug 21 that is threaded into the counterbore 16.

Accommodated in the bore 18 of the cylinder 17 is a sensing mass 22. The mass 22 comprises a sphere formed of glass, a suitable ceramic, or low expansion nickel iron alloy having a diameter less than the diameter of the bore 18 so as to provide a clearance 23 between the mass 22 and the inner surface of the bore 18. The diameters of the bore 18 and the mass 22 are chosen so that the clearance 23 provides for viscous flow of fluid (air or other gas) through the clearance for the purposes of establishing a rate of longitudinal movement of the mass through the cylinder 17 that is proportional to the force to which the mass is subjected, and to compensate for temperature changes, all as set forth in more detail in U.S. Pat. No. 3,974,350. Typically, the clearance 23 is between 0.0005 inch and 0.01 inch. If the sensing mass 22 is made of metal the clearance will be somewhat smaller than if made of ceramic or glass material.

The housing 13 includes a second bore 24 that extends in prolongation of the bore 14 on the opposite side of the shoulder 15. The bore 24 preferably includes diametrically opposed, confronting pairs of guide ribs 25, the ribs of each pair being spaced from one another by a slot 26. That end 27 of the bore 24 remote from the shoulder 15 is cylindrical and interiorly threaded.

Fitted into the bore 24 is an elongate sleeve 28 having a cylindrical bore 29 extending therethrough. A washer 30 is seated on the shoulder 15 and between the washer and the confronting end of the sleeve 28 is an annular cushion 31 formed of rubbery material. The sleeve 28 has diametrically opposed, radially projecting ribs 32 that are accommodated in the slots 26 to preclude rotation of the sleeve 28 relative to the housing 13. The sleeve 28 is maintained assembled with the body 13 by means of a plug 33 fitted into the threaded end 27 of the bore 24.

Figure 3:
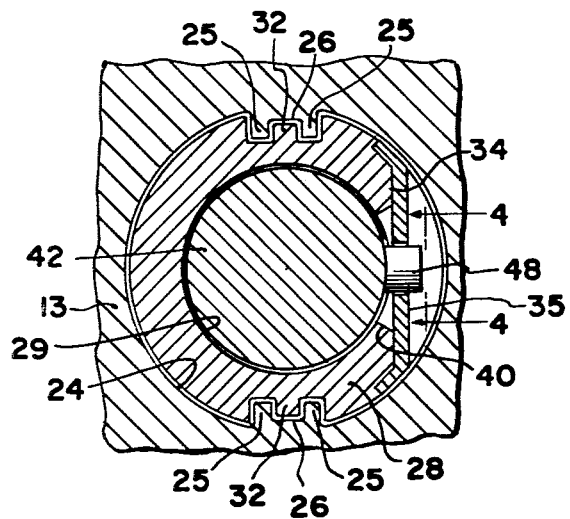
FIG. 3 is a sectional view taken on the line 3—3 of FIG. 2.
Figure 4:
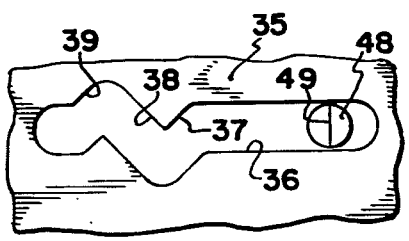
FIG. 4 is a fragmentary, elevational view, of parts shown in FIG. 3 as viewed in the direction of the arrows 4—4.
Figure 5:
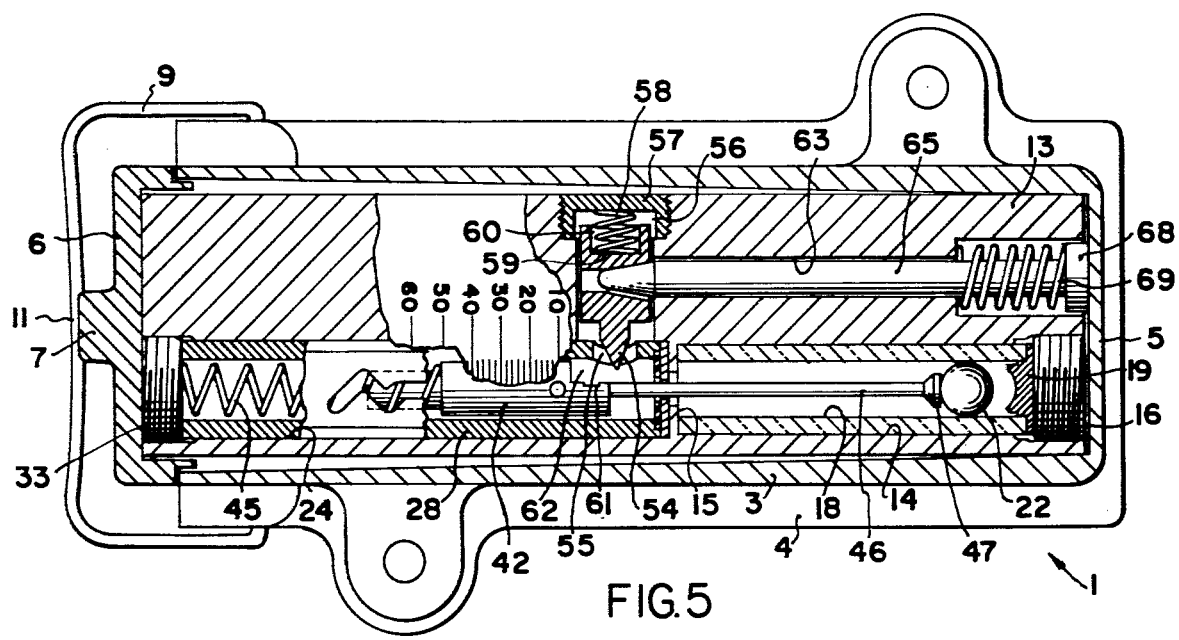
FIG. 5 is a view similar to FIG. 2, but illustrating the parts in adjusted positions following a crash.

One side of the sleeve 28 is provided with a flattened surface 34 that is substantially tangential to the inner surface of the bore 29. Fixed to the flattened surface 34 is a plate 35 in which is formed an elongate linear slot 36 that extends longitudinally from a point adjacent the shoulder 15 toward the opposite end of the bore 24. The slot 36 communicates with a plurality of sinuous or zigzag slot portions 37, 38, and 39. In the disclosed embodiment, the slot portion 37 extends at an angle of about 45° from the slot 36, the portion 38 extends at an angle of about 90° to the portion 37, and the slot portion 39 extends at an angle of about 90° to the slot portion 38. The angularity of the slot portions may be different from those specified. The sleeve 28 is provided with a slot 40 (FIG. 3) corresponding to and communicating with the slots 36–39.

Figure 2:
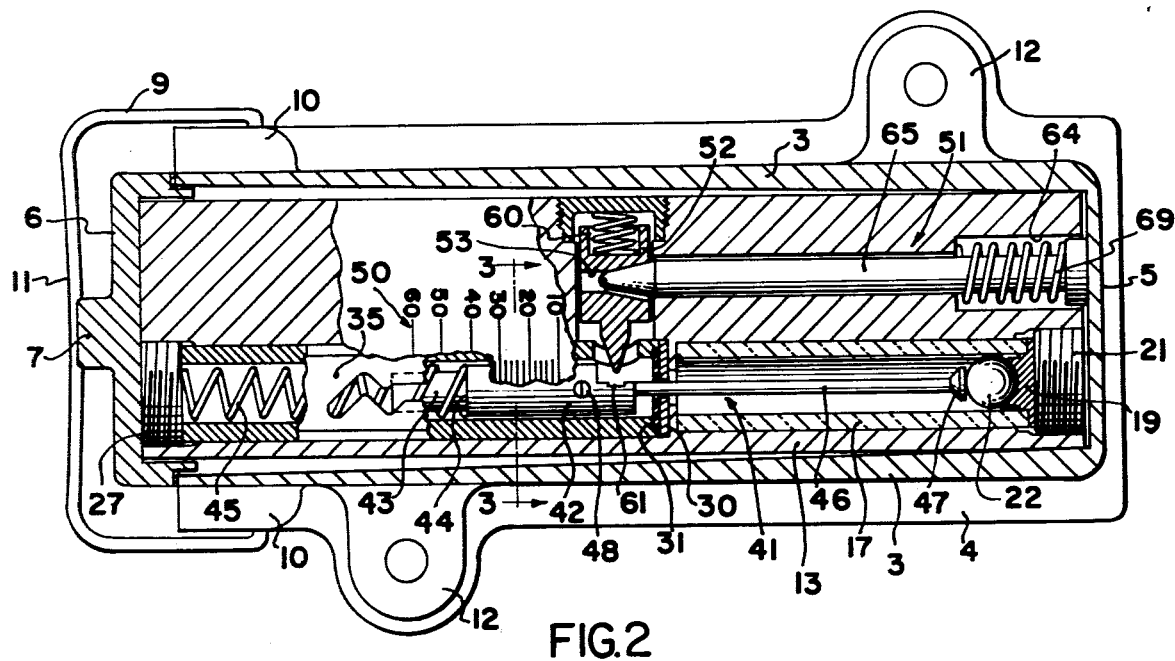
FIG. 2 is a sectional view taken on the line 2—2 of FIG. 1 and illustrating the indicator apparatus within the casing in condition for operation.

The apparatus includes biasing means 41 for yieldably maintaining the sensing mass 22 in an initial or rest position and comprises a metallic body 42 freely and slidably accommodated in the bore 29 of the sleeve 28. One end of the body 42 has a reduced diameter 43 which provides a shoulder 44 against which one end of a spring 45 seats. The opposite end of the spring seats on the plug 33. Secured to and projecting from the opposite end of the body 42 is a rod 46 which passes through the washer 30 and the cushion 31 and terminates at its free end in a foot 47 that is adapted to seat on the mass 22. The spring 45 exerts a selected one of any number of predetermined forces, such as about 3 G's, on the body 42 as a consequence of which a force greater than that exerted by the spring must be imposed on the body 42 to enable it to be displaced from its normal position as indicated in FIG. 2.

An indicating pin 48 is fixed to the body 42 and projects radially therefrom through and beyond the slots 36 and 40. The pin has a reference line 49 inscribed thereon that is adapted to be used in conjunction with indicia 50 provided on the housing 13 adjacent the slot 36 for a purpose presently to be explained.

Locking means 51 is provided for automatically locking the biasing mass 41 against movement when the housing 13 is out of the casing 1 and for automatically unlocking the biasing mass upon installation of the housing 13 into the casing 1. The locking means comprises a bolt 52 slidably accommodated in a bore 53 formed in the housing 13 normal to the bore 24 and extending along a line which intersects the latter. The inner end of the bolt 52 terminates in a tapered, longitudinally extending blade 54 which is accommodated in an opening 55 formed in the sleeve 28. The opening is of such size as freely to accommodate the blade 54. The bore 53 has a threaded counterbore 56 in which is fitted a correspondingly threaded plug 57 against which seats one end of a powerful compression spring 58, the opposite end of which seats against the base 59 of a recess 60 formed in the bolt 52. The arrangement is such that the bolt 52 normally is urged by the spring 58 toward a position in which the tip of the blade 54 seats and bears forcibly against the base 61 of a groove 62 formed in the cylinder 42.

The locking means 51 also includes an elongate bore 63 in the housing 13 which communicates at one end with the bore 53 and has at its other end a counterbore 64. Slidably accommodated in the bore 63 is a locking pin 65 having at one end a tapered nose 66 that is adapted to be accommodated in a correspondingly tapered recess 67 formed in the bolt 52. At its opposite end the locking pin has an enlarged head 68 that is capable of being accommodated in the counterbore 64 and against which seats one end of a compression spring 69. The opposite end of the spring 69 seats on a shoulder 70 formed by the counterbore 64. The spring 69 constantly exerts a force on the locking pin 65 urging the latter in a direction to withdraw the nose 66 from the recess 67.

The apparatus includes means for retaining the sensing mass 22 in any one of a number of adjusted positions displaced from the initial or rest position shown in FIG. 2, provided the sensing mass is displaced a predetermined minimum distance from the initial position. The retaining means comprises a plurality of pits or recesses 71 formed in the inner surface of the bore 18 of the cylinder 17 and a plurality of small diameter particles 72, such as aluminum spheres, that are independent of the mass 22 and one another. The recesses 71 are formed by a sandblasting or other known process that produces an irregular or frosted surface 73.

The diameter of the particles 72 is slightly greater than the clearance 23 between the mass 22 and the cylinder bore 18 so that, should one or more of the particles 72 reach a position in which they occupy some of the recesses 71, they will extend into the path of movement of the mass 22 and exert a wedging force between the latter and the surface of the bore 18 preventing movement of the mass past the particles 72.

Figure 6:
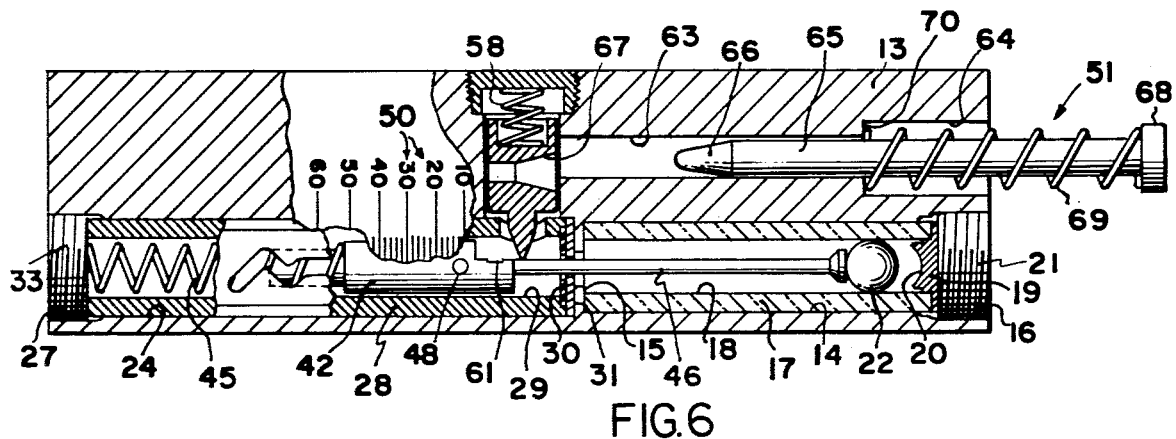
FIG. 6 is a view similar to FIG. 4, but illustrating the indicating device removed from the casing.
Figure 7:
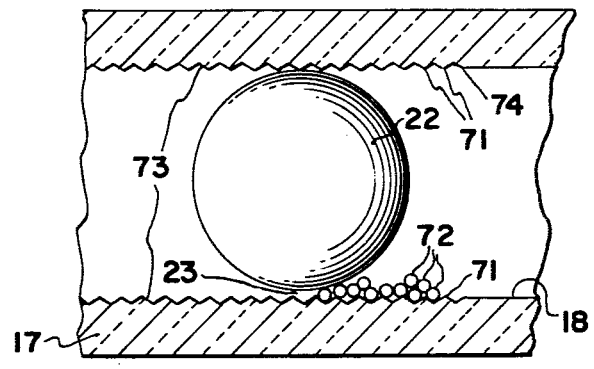
FIG. 7 is a greatly enlarged sectional view of the sensing mass, a portion of the cylinder within which the mass is positioned, and some of the retaining particles.

The frosted portion 73 of the cylinder bore 18 commences at a point 74 between the ends of the cylinder and extends toward the left hand end of the latter, as viewed in FIGS. 2 and 7. That portion of the surface to the right of the point 74, however, is smooth, i.e., devoid of pits or recesses. The particles 72 are contained in the cylinder bore 18 to the right of the mass 22, as viewed in FIG. 6, and the diameter of the particles 72 is 0.002-0.004 inch greater than the dimension of the clearance 23. Consequently, none of the particles 72 can move longitudinally of the bore 18 past the mass 22.

To condition the apparatus for operation, the housing 13 is introduced to the casing 1 and the closure 6 secured to the open end of the casing. As the closure 6 moves toward its closed position, the locking pin 65 is displaced by the rear wall 5 of the casing causing the nose 66 to move into the recess 67 and withdraw the bolt blade 54 from engagement with the body 42. The biasing spring 45 will hold the body 42 and the rod 46 to the right, thereby holding the mass 22 in its initial or rest position on the seat 20. All of the particles 72 are at the right of the mass 22. The casing 1 then may be screwed, bolted, or otherwise secured to a portion of the vehicle in such manner that the longitudinal axis of the casing is parallel to a desired axis of the vehicle. For example, the casing 1 may be secured to the vehicle so that the longitudinal axes of the casing and the vehicle are parallel.

If the vehicle on which the apparatus is mounted is assumed to be traveling in the direction indicated by the arrow 75 in FIG. 1, and if the vehicle is subjected suddenly to an acceleration pulse, such as that caused by the vehicle's crashing into some other object, and if the acceleration pulse is sufficiently large, the biasing body 42 will overcome the force of the spring 45 and immediately move to the left, compressing the spring 45 and withdrawing the foot 47 from engagement with the spherical mass 22. The mass 22 thus will be able to move to the left from its initial or rest position toward an adjusted position. The particles 72 also will move to the left and trail the mass 22 inasmuch as they also are subjected to the acceleration pulse. Since the right hand end of the cylinder is sealed by the fitting 19, the rate of movement of the mass 22 is damped by the necessity of the fluid's having to flow through the clearance 23, as a consequence of which the rate of movement of the mass 22 is considerably less than that of the biasing mass cylinder 41.

If the acceleration pulse is of such magnitude as to enable the biasing body 42 to bottom against the plug 33, there will be a tendency of the cylinder to rebound and effect re-engagement of the foot 47 and the mass 22 prior to the latter's completing its maximum movement to the left. As the body approaches the plug, however, the angular slot portions 38-40 cause the indicator pin 48 to oscillate, which oscillation is transmitted to the body 42 thereby absorbing a substantial portion of the kinetic energy of the body 42 and delaying the movement of the latter longitudinally of the sleeve 28. Return movement of the body 42 similarly is delayed.

If the acceleration pulse is of such short duration that it decays prior to the time that the mass 22 moves into the frosted portion 73 of the cylinder bore 18, the biasing spring 45 will reassert itself and effect return movement of the mass 22 toward its initial position. As the mass moves to the right, the retaining particles 72 will be pushed toward the right by the mass inasmuch as the surfaces of the mass and the bore 18 are smooth.

If the acceleration pulse is of such magnitude and duration that the mass 22 is enabled to move from its initial position to an adjusted position in which it occupies the frosted portion 73 of the cylinder 17, such as would be the case in a crash of a severe nature, some of the retaining particles 72 also will occupy the frosted portion of the cylinder and seat in the recesses 71. Under these circumstances decay of the pulse and reassertion of the force of the biasing spring 45 will effect return of the body 42 and the rod 46 to a position in which the foot 47 engages the mass 22, but those particles 72 seated in the recesses 71 will bridge the clearance 23 and become wedged between the mass and the surface of the base, thereby preventing return of the mass 22 toward its initial position. As a consequence, the indicator pin 48 will occupy a position displaced from its initial position with the reference line 49 opposite one of the lines of indicia 50. The indicia 50 may be calibrated in miles per hour, kilometers per hour, or the like. The severity of a crash in which the vehicle was involved thus is indicated.

Following the crash, the casing 1 may be opened by removal of the closure 6 and the housing 13 withdrawn from the casing. As the housing is withdrawn, the spring 69 displaces the locking pin 65 to the right, thereby enabling the bolt 59 to move toward the cylinder 42 until the blade 54 engages either the cylinder or the rod 46, thereby providing a positive lock on the cylinder to prevent its movement in either direction. The indicator pin 48 thus is maintained in a position in which it records the severity of the crash.

The point 74 at which the frosted portion 73 of the cylinder bore 18 commences may be located as desired. It is contemplated, however, that the point of commencement of the frosted portion will be so located that acceleration at a predetermined rate for a predetermined period of time, in milliseconds, must be encountered before the mass 22 can move a distance sufficient to enter the frosted portion and thereby be restrained from returning to its initial position.

Although the indicia 49 and 50 make more convenient the determination of the maximum acceleration to which a vehicle is subjected, they are not essential. It is possible to compute the acceleration by measuring the distance the sensing mass has been displaced from its initial position.

The number and angularity of the slot portions 37-39 and the length of the linear slot portion 36 between the first angular slot portion 37 and the initial or rest portion of the pin 48 have an effect on the movement of the mass 22 into the frosted portion 73 of the bore 18. In general, the greater the number of angular slot portions, the steeper the angle between adjacent slot portions, and the shorter the distance between the pin 48 and the first slot portion 37, the greater must be the duration of the acceleration pulse to enable the mass 22 to move into the frosted portion 73, and vice versa. All of these factors may be determined empirically. Thus, apparatus according to the invention can be constructed to enable acceleration pulses of widely varying magnitudes and duration to be measured.

This disclosure is representative of a presently preferred embodiment of the invention, but is intended to be illustrative rather than definitive thereof. The invention is defined in the claims.

I claim:

1. A velocity change sensor comprising a housing; a displaceable mass carried by said housing for movement relative thereto along a path in a direction from a rest position to an adjusted position in response to a change in velocity of said housing; and means for retaining said mass in said adjusted position, said retaining means including a plurality of particles independent of said mass and independent of one another and movable along said path with said mass, the relative positions of said mass and said particles being such that the latter trail the movement of said mass along said path.

2. A sensor according to claim 1 including yieldable means biasing said mass toward said rest position.

3. A sensor according to claim 1 including movable indicator means displaceable in response to said change in velocity and engageable with said mass following movement of the latter toward said adjusted position, and indicia carried by said housing adjacent said indicator means for indicating the extent of movement of said mass from said rest position.

4. A sensor according to claim 1 including means biasing said mass toward said rest position, said biasing means being displaceable in said direction in response to said change in velocity of said housing; and means acting on said biasing means for damping movement of the latter in said direction.

5. A sensor according to claim 4 wherein said damping means acts on said biasing means to damp movement of the latter in the opposite direction.

6. A velocity change sensor comprising a housing; an elongate tubular member carried by said housing; a displaceable mass positioned within said tubular member for movement longitudinally thereof along a path from a rest position to an adjusted position in response to a change in velocity of said housing; and retaining means carried by said tubular member operable to retain said mass in said adjusted position, said retaining means including a plurality of members independent of said mass and independent of one another operable to move with said mass toward said adjusted position and become wedged between said mass and said tubular member.

7. A sensor according to claim 6 wherein said tubular member has at least a portion of its inner surface roughened to form a number of recesses in which said independent members may seat.

8. A sensor according to claim 7 wherein said roughened portion of the inner surface of said tubular member commences at a point between the rest and adjusted positions of said mass.

9. A sensor according to claim 6 including yieldable means biasing said mass toward said rest position.

10. A sensor according to claim 9 including movable indicator means displaceable in response to said change in velocity and engageable with said mass following movement of the latter toward said adjusted position, and indicia carried by said housing adjacent said indicator means for indicating the extent of movement of said mass from said rest position.

11. A velocity change sensor comprising a housing; an elongate tubular member carried by said housing; a displaceable mass within said tubular member movable longitudinally thereof, yieldable means biasing said mass in one direction toward a rest position, said mass being movable from said rest position in the opposite direction toward an adjusted position in response to acceleration of said housing in said one direction sufficient to overcome said biasing means; and retaining means independent of said mass and being movable with the latter in said opposite direction in response to said acceleration of said housing, said retaining means being carried by said tubular member in a position to trail movement of said mass in said opposite direction, said retaining means being operable in response to movement of said mass a predetermined distance toward said adjusted position to disable said biasing means from moving said mass toward said rest position.

12. A sensor according to claim 11 wherein said mass comprises a sphere.

13. A sensor according to claim 12 wherein said sphere has a smooth surface.

14. A sensor according to claim 11 wherein there is sufficient clearance between said mass and said tubular member to provide viscous flow of fluid through said clearance.

15. A sensor according to claim 11 including movable indicator means displaceable in response to said change in velocity and engageable with said mass following movement of the latter toward said adjusted position, and indicia carried by said housing adjacent said indicator means for indicating the extent of movement of said mass from said rest position.

16. A sensor according to claim 11 wherein there is a clearance between said mass and said tubular member, and wherein said retaining particles are of such size as to bridge said clearance and become wedged between said mass and said tubular member.

17. A sensor according to claim 16 wherein at least a portion of said tubular member has an irregular surface.

18. A sensor according to claim 16 wherein said tubular member has an irregular surface commencing at a point between its ends, the remainder of said tubular member having a smooth surface.

19. A sensor according to claim 11 wherein said biasing means includes a body member displaceable longitudinally of said housing in response to said acceleration of said housing; and means for imparting rotary movement to said body member in response to longitudinal movement of the latter.

20. A sensor according to claim 11 wherein said biasing means includes a body member displaceable longitudinally of said housing in response to said acceleration of said housing; and indicia carried by said housing and said body member for indicating the extent of such longitudinal movement of the latter.

21. A velocity change sensor comprising a housing; an elongate tubular member carried by said housing; a displaceable mass within said tubular member movable longitudinally thereof; yieldable means biasing said mass in one direction toward a rest position, said mass being movable from said rest position in the opposite direction toward an adjusted position in response to acceleration of said housing in said one direction at a rate sufficient to overcome said biasing means; retaining means carried by said tubular member and operable in response to movement of said mass a predetermined distance toward said adjusted position to disable said biasing means from moving said mass toward said rest position, said biasing means including a body member displaceable longitudinally of said housing in response to said acceleration of said housing; and means for imparting rotary movement to said body member in response to longitudinal movement of the latter.

22. A velocity change sensor comprising a housing; an elongate tubular member carried by said housing; a displaceable mass within said tubular member movable longitudinally thereof; yieldable means biasing said mass in one direction toward a rest position, said mass being movable from said rest position in the opposite direction toward an adjusted position in response to acceleration of said housing in said one direction at a rate sufficient to overcome said biasing means; retaining means carried by said tubular member and operable in response to movement of said mass a predetermined distance toward said adjusted position to disable said biasing means from moving said mass toward said rest position, said biasing means including a body member displaceable logintudinally of said housing in response to said acceleration of said housing; and means cooperable between said housing and said body member for locking the latter relatively to said housing in any selected position of said body member.

* * * * *